(12) United States Patent (10) Patent No.: US 9,269,258 B2
Lehtonen (45) Date of Patent: Feb. 23, 2016

(54) METHOD AND CONTROL ARRANGEMENT TO SECURE AN ALARM SYSTEM

(71) Applicant: Vihtori Lehtonen, Lannevesi (FI)

(72) Inventor: Vihtori Lehtonen, Lannevesi (FI)

( * ) Notice: Subject to any disclaimer, the term of this patent is extended or adjusted under 35 U.S.C. 154(b) by 0 days.

(21) Appl. No.: 14/400,470

(22) PCT Filed: Jan. 21, 2013

(86) PCT No.: PCT/FI2013/050062
§ 371 (c)(1),
(2) Date: Nov. 11, 2014

(87) PCT Pub. No.: WO2013/153256
PCT Pub. Date: Oct. 17, 2013

(65) Prior Publication Data
US 2015/0154852 A1 Jun. 4, 2015

(30) Foreign Application Priority Data

Apr. 13, 2012 (FI) ...................................... 20125403

(51) Int. Cl.
*G08B 13/00* (2006.01)
*G08B 25/01* (2006.01)
(Continued)

(52) U.S. Cl.
CPC .......... *G08B 25/016* (2013.01); *G08B 21/0286* (2013.01); *G08B 29/123* (2013.01);*G08B 29/16* (2013.01); *H04W 4/22* (2013.01); *G08B 25/009* (2013.01); *G08B 25/10* (2013.01); *G08B 29/14* (2013.01)

(58) Field of Classification Search
CPC .... G08B 25/08; G08B 21/0286; G08B 29/06; H04W 4/22; H04W 76/007
USPC ...................... 340/541; 455/404.2, 414.1, 466
See application file for complete search history.

(56) References Cited

U.S. PATENT DOCUMENTS

| | | | |
|---|---|---|---|
| 4,206,449 A | 6/1980 | Galvin et al. | |
| 2004/0053603 A1* | 3/2004 | Langstrom | G08B 21/028 455/414.1 |
| 2006/0003778 A1* | 1/2006 | Hogdahl | G08B 25/08 455/466 |
| 2010/0167688 A1* | 7/2010 | Langstrom | G08B 21/028 455/404.2 |

FOREIGN PATENT DOCUMENTS

| | | |
|---|---|---|
| FI | 117992 B | 5/2007 |
| FI | 120064 B | 6/2009 |

(Continued)

OTHER PUBLICATIONS

PCT/ISA/210—International Search Report—Jul. 29, 2013 (Issued in Application No. PCT/FI2013/050062).

*Primary Examiner* — John A Tweel, Jr.
(74) *Attorney, Agent, or Firm* — Venable LLP; Eric J. Franklin

(57) ABSTRACT

A method and control arrangement to secure an alarm system in a site to be monitored. The readiness to forward an alarm out of the site is monitored with a control arrangement through which at least data transmission connections of the alarm system to outside the site are repetitively checked to enable sending the alarm via at least one secondary alarm connection in case the primary alarm connection is prevented. The control arrangement includes at least two controlling devices that monitor continuously the electric connection/ readiness of the site to at least two of the following:
 a data transmission route working on a free frequency,
 a mobile phone network,
 an electricity grid,
 the internet,
 one or several other controlling devices,
 a communication connection working on a free frequency,
 an alarm arrangement belonging to the alarm system,
 a wired connection.

12 Claims, 4 Drawing Sheets

(51) Int. Cl.
*H04W 4/22* (2009.01)
*G08B 21/02* (2006.01)
*G08B 29/12* (2006.01)
*G08B 29/16* (2006.01)
*G08B 25/10* (2006.01)
*G08B 25/00* (2006.01)
*G08B 29/14* (2006.01)

(56) References Cited

FOREIGN PATENT DOCUMENTS

| WO | WO-02/09465 A1 | 1/2002 |
| WO | WO-03/075588 A1 | 9/2003 |
| WO | WO-2005072075 A2 | 8/2005 |
| WO | WO-2007/042610 A1 | 4/2007 |

* cited by examiner

METHOD AND CONTROL ARRANGEMENT TO SECURE AN ALARM SYSTEM

CROSS-REFERENCE TO RELATED APPLICATIONS

This application claims priority under 35 U.S.C. §119 to Finnish patent application 20125403filed 13 Apr. 2012 and is the national phase under 35 U.S.C. §371 of PCT/FI2013/050062 filed 21 Jan. 2013.

FIELD OF THE INVENTION

The invention relates to a method and control arrangement to secure an alarm system.

BACKGROUND OF THE INVENTION

General wireless alarm systems on the market today typically consist of alarm devices that work on a mobile phone network, such as e.g. on a GSM-network, which are very vulnerable. This is due to the fact that there are various different easily accessible obstructing devices, downloadable e.g. via Internet, by means of which it is possible to obstruct or block e.g. a GSM- or another type of wireless network. Obstructing wireless networks with these types of devices has brought up a challenge that has not yet been solved in a way that alarm systems based on a mobile phone network or other wireless networks could reliably fulfill their purpose. Because the above mentioned blocking devices are cheap and widely available on the market, and because using them does not require special skills e.g. in radio technology, it is thus clear that protecting one's property or estate is not on a sufficient level when using wireless alarm systems according to the present technique.

For securing an alarm system a method is presented e.g. in Finnish patent No. 117992 that aims to enhance transmission security of an alarm, which method is based on the fact that the device for forwarding the alarm is set up with a subscriber identity module from a mobile phone operator that is not limited to operate in only one mobile phone network in the country in question. Functioning of the device for forwarding an alarm and its connectivity are being monitored by forming a test connection. An authority alarm is given by making an emergency call from the alarm forwarding device to an emergency central, in case the authority alarm fails to be transmitted through the alarm forwarding device's primary forwarding connection in a time limit set beforehand.

Especially based on the figures of said patent, it may be seen that said solution is especially targeted towards forwarding arrangements outside the site that is being monitored. In said patent, the blocking or obstructing of a wireless network as described in the beginning has not been in any way taken into account, even though said patent is based on the sending of an actual alarm wirelessly. As the solution according to said patent is based on the principle that in case of an alarm, the system tries to connect to a control centre, it can not secure a reliable functioning of the alarm system, especially in case of a wireless network blocking situation of the type described above or in addition to the above a possible obstruction situation of the electrical network.

Furthermore, in Finnish patent 120064 is presented a method and apparatus for forwarding notifications from a remote device to a control node. This solution is based on the sending of a notification automatically between a remote node and control node, the above being connected with each other by a data network. In the method, a remote node is determined to the control node, which nodes are registered to a server together. An event notification concerning the remote node is ordered to the control node from the server. The control node notes the time taken by the order and repeats the order. An external signal is noted in the remote node, and a message is sent from the remote node to the control node. The control node checks the presence of information in the remote node and registers the message.

The solution above is based on acquiring information from the remote node (the site to be monitored), to a so called SIP-server, whereby the server makes a connection attempt to the remote node in a determined time, and the remote node gives the information to the server to be forwarded by the same. If necessary, the remote node can give a quick message to the server to be forwarded by the same. Also in this solution it is necessary to use e.g. a GSM- or an internet connection. In this solution, the SIP-server is in a managing position, which is why it also creates a bottleneck for the functioning of this solution due to the same reasons mentioned above regarding patent FI 117992. Therefore, with this solution, either an alarm system can not be sufficiently secured in case of a previously described obstruction of a wireless network, and/or an electrical network.

The solutions described above therefore share a similar function in a way that when recognizing an observation/alarm, they take a connection and make an alarm through a transmission route from the site to be monitored to outside thereof. In the implications of these solutions the used transmission servers, managing organs and other forwarding arrangements between the site to be monitored and the receiver of the alarm, form a critical entirety for the part of their functioning reliability, which may be severed by blocking operations especially focused on wireless networks and/or electrical network obstructing operations etc., due to which they thus prevent completely, or at least slow down receiving of an alarm. These systems are also technically demanding and expensive in both execution and management due to the complicated device compositions related thereto.

SUMMARY OF THE INVENTION

It is an aim of the method and control arrangement to secure an alarm system according to the present invention to achieve a decisive improvement in the problems described above and thus to raise essentially the level of prior art. In order to carry out this aim, the method and control arrangement according to the invention are mainly characterized by what has been presented below.

As the most important advantages of the method and control arrangement to secure an alarm system according to the invention may be mentioned simplicity and efficiency of the functioning principles and the appliances used in executions of the invention. The invention is based on a few simple communication principles, ergo, first of all that in the alarm system continuous connection checks are being made, whereby in a site, different kinds of wireless and/or if necessary wired transmitters and receivers, ergo sensor elements, connected to one or more alarm devices' processors, make so called internal connection checks constantly between each other. In this way, they investigate if the connections are working and instantly give out an alarm with the alarm device's processor, in case a sensor element does not respond to the connection request. In the manner described above, it is also possible to check the connections connecting the site to the public network, such as the mobile phone network and internet connections.

In the invention, it is furthermore possible to exploit more controlling devices in the site and, in addition or instead of the above, one or more controlling devices being external to the site in a physically totally detached manner, in which case each external controlling device constantly makes connection checks in order to examine whether the connections are working, and gives out an alarm in case one or more controlling devices in the site stop responding to the requests. As an advantageous embodiment of the invention e.g. on the principle shown in FIG. 3, when using controlling devices located advantageously, essentially in different places in the site, they form a partly overlapping covering area. This means in practice that e.g. a person invading the site should be able to block simultaneously all the frequencies used by the sensor elements of each of the controlling devices. In other words, the person should have information on the locations of different controlling devices, mutual distances of the same, and the locations of traditional security devices, such as motion detectors, etc. In addition, the person should have a sufficiently powerful obstructing device, which in its part brings about other technical problems. Furthermore, when using an external controlling device, the person should first of all be aware of, and on the other hand be able to, shut down simultaneously also the controlling device external to the site, ergo located e.g. possibly even on a different continent. Therefore "going round" an alarm system secured according to the invention is practically impossible.

Other advantageous embodiments of the method and control arrangement according to the present invention have been presented herein.

BRIEF DESCRIPTION OF THE DRAWINGS

In the following description, the invention is being illustrated in detail with reference to the appended drawings, in which.

DETAILED DESCRIPTION OF EMBODIMENTS OF THE INVENTION

The invention relates first of all to a method to secure an alarm system, which method is meant especially for securing the forwarding of an alarm of an abnormal action or situation in a site. K, detected by an alarm arrangement, such as one or more burglary or motion detectors, window sensors and/or the like, of the alarm system monitoring the site K, out of the site K from the alarm system. The alarm system's readiness of forwarding an alarm out of the site is being monitored by a control arrangement belonging thereto, by which at least data transmission connections of the alarm system to outside the site are being repetitively checked in order to enable sending the alarm via one or more secondary alarm connections in case the primary alarm connection is prevented. The control arrangement comprises, e.g. with reference to FIGS. 3 and 4, at least two separate controlling devices 1, 1', when each controlling device by its data processing unit a, such as one or more microprocessors, logical circuits and/or the like, through sensor elements b coupled thereto monitors continuously the site's K electric connection/readiness to at least two of the following:

b1: a data transmission route working on a free frequency (ISM-bands), such as to a WLAN-, Bluetooth-, ZigBee-network and/or the like, b2: a mobile phone network, such as to a NMT-, GSM-, GPRS-, 3G-, 4G-net and/or the like, b3: an electricity grid, b4: the internet, b5: one or several other controlling devices 1, 1', b6: a communication connection working on a free frequency (ISM-bands), such as a 902-928 MHz, 2,4000-2,4835 Ghz, 5,728-5,850 Ghz frequency route and/or the like, b7: an alarm arrangement belonging to the alarm system, b8: a wired connection, such as a landline phone network, a landline network between the controlling devices and/or the like.

When the data processing unit a detects a faulty connection/state of one or more sensor elements b, the alarm to outside the site K is being forwarded by the controlling device 1, 1' through an external data transmission connection that has been ascertained available for its one or more sensor elements b.

Figure 3:
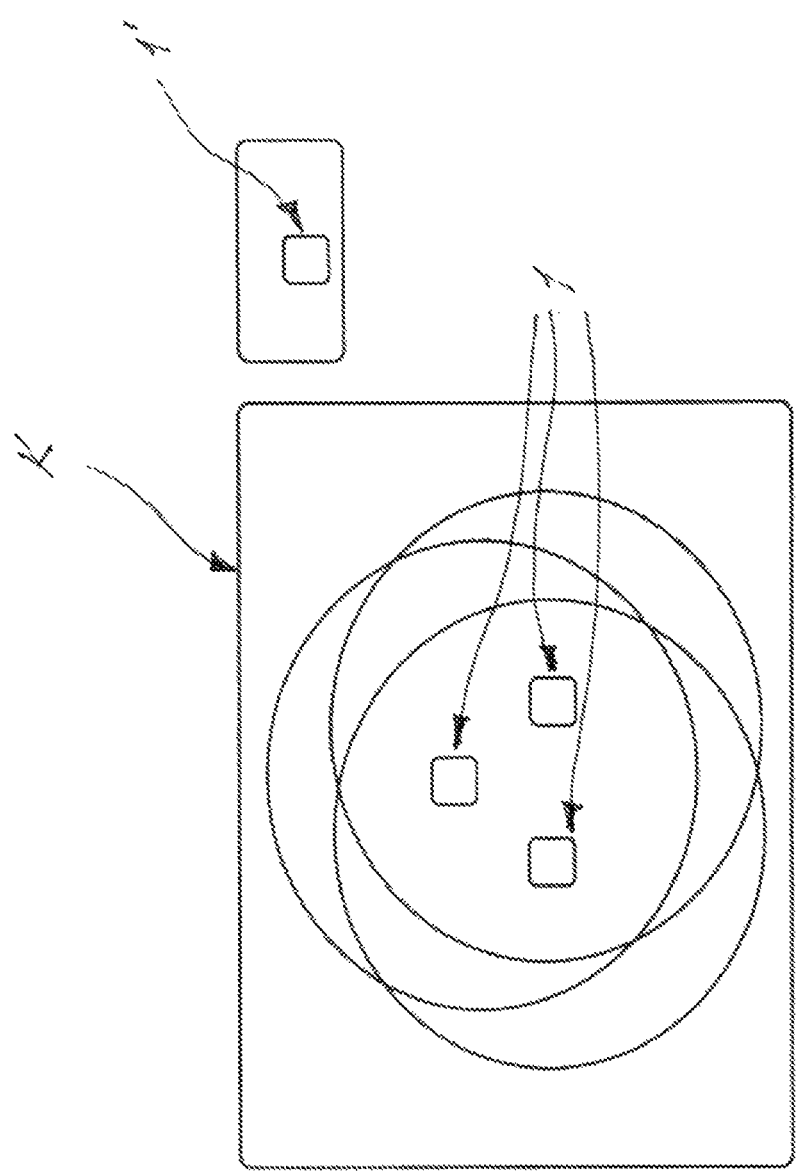

Especially with reference to the advantageous embodiment shown in FIG. 3, in the method two or more controlling devices 1 are being utilized that are situated essentially in different locations in the site K and coupled with each other at least in a data transmitting manner, between which mutual connection/state checks are being made.

Figure 4:
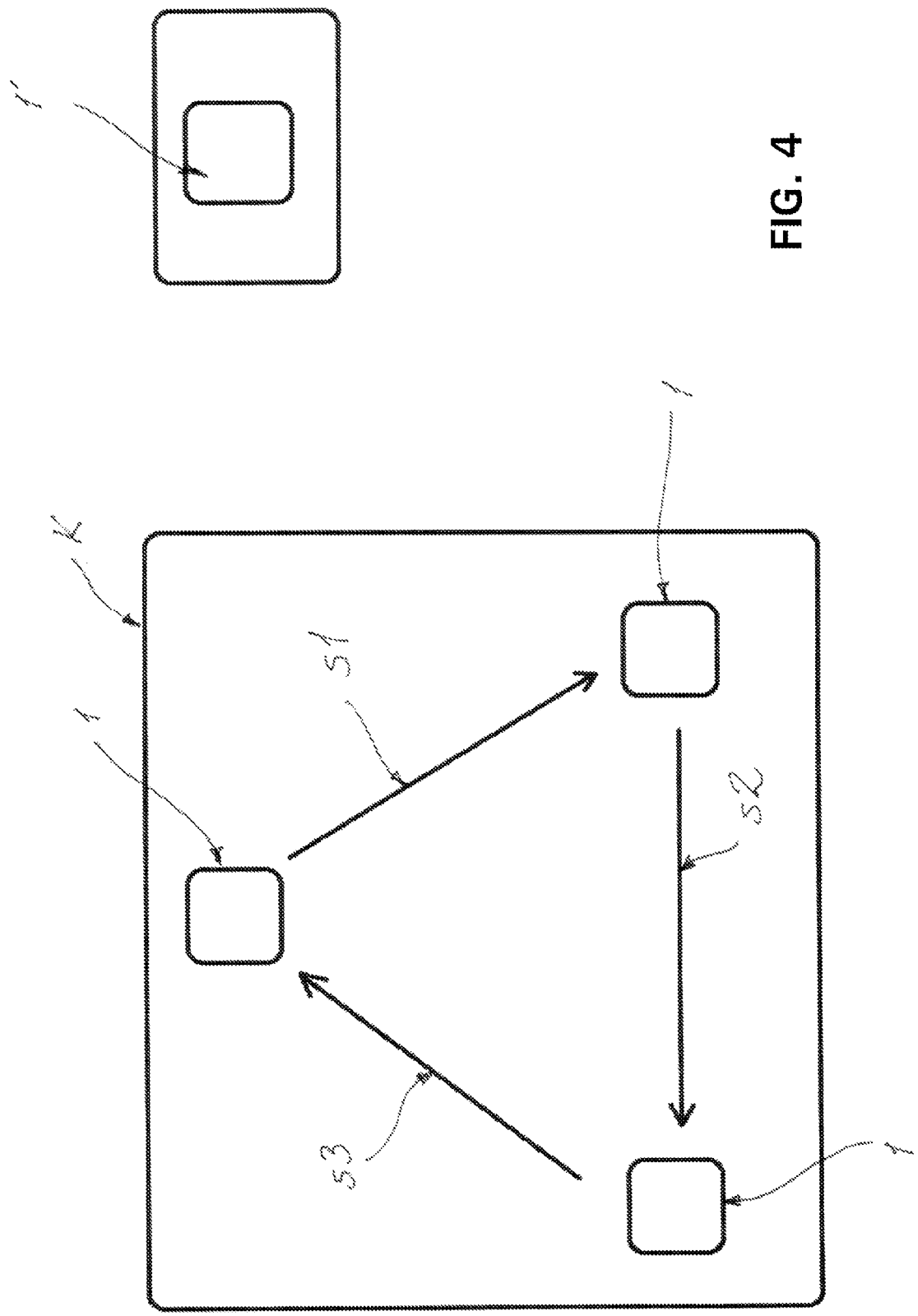

As an alternative or complementary embodiment to the above, according to FIGS. 3 and 4 in the method one or more advantageously accumulator operated or in another way current supply ensured controlling devices 1' external to the site are utilized, whereby mutual connection/state checks are being made between the external controlling device 1' and the one or more controlling devices 1 in the site.

In the method according to the invention, it is possible to utilize in the site K, when needed, accumulator operated, or in another way, current supply ensured controlling devices 1 being configured mutually correspondingly. On the other hand, with reference to the advantageous embodiment shown in FIG. 4, it is possible to simplify the device composition utilized in the invention by using in the site K two or more, advantageously, three controlling devices 1, that are used on a loop principle s1, s2, s3, whereby the controlling devices 1 do not necessarily have in common other sensor elements making connection/state checks than the sensor elements b; b5 performing the mutual connection/state checks of the controlling devices 1. In this way, each of the controlling device's sensor elements may be chosen in a way that all the necessary external alarm readinesses will be checked by the controlling devices coupled to function one after the other in the loop, whereby each of which execute their own part of the state/connection checks of available alarm readinesses.

Figure 1:
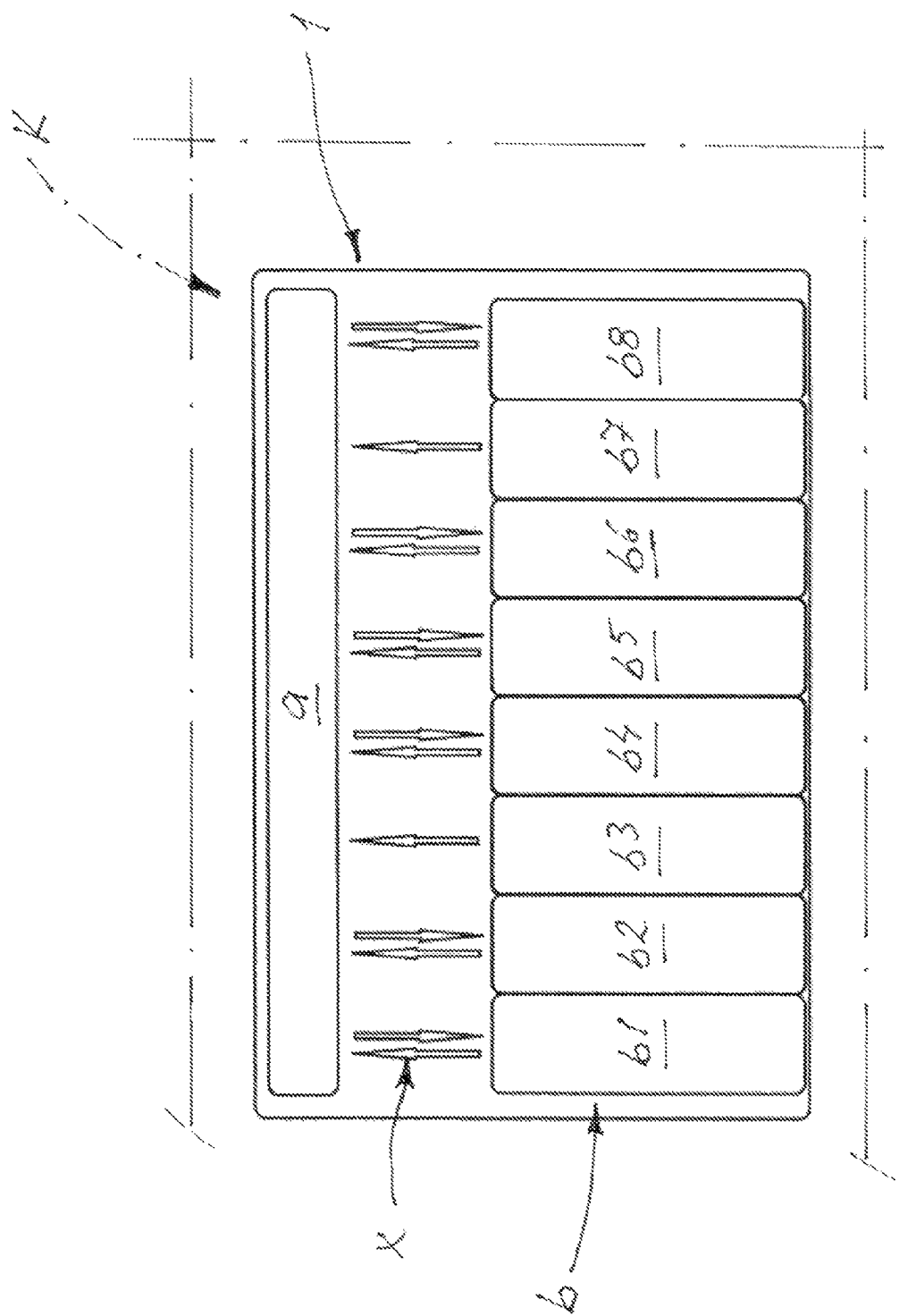
in FIG. 1 is shown an exemplary composition of a controlling device to be positioned in a site according to the invention, in which different kinds of sensor elements existing therein are connected with one- or two-way connections to a processing unit therein, in FIG. 2 is shown an exemplary composition of a controlling device to be positioned according to the invention outside the actual site to be monitored, the sensor elements therein being connected with two-way connections to the processing unit therein, in FIG. 3 is shown an exemplary overview of controlling device placements being used according to the invention complementary or alternative to each other in connection with the site to be monitored, and in FIG. 4 is shown an exemplary operational chart of controlling devices connected to work on a loop principle.
Figure 2:
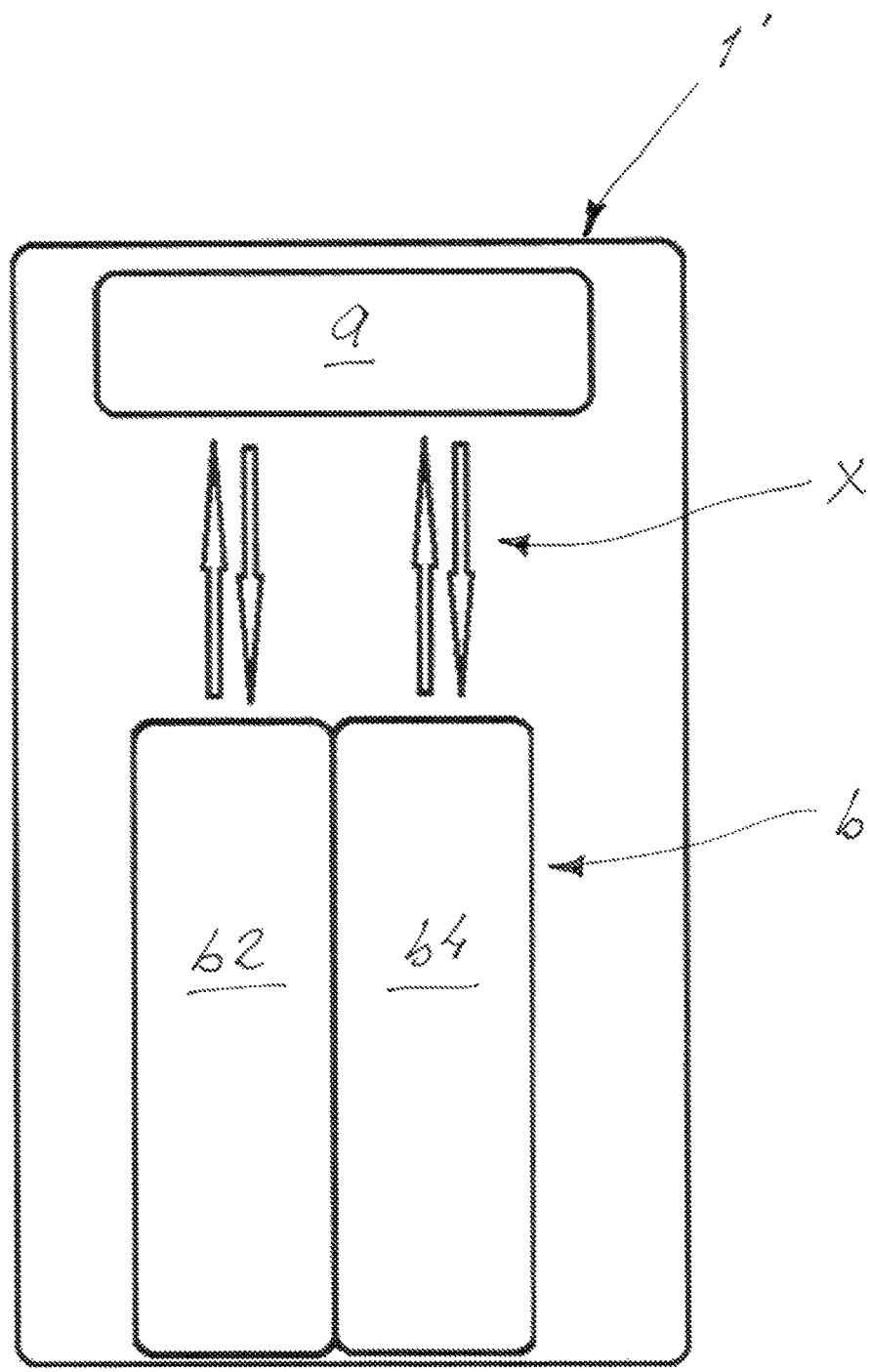

Furthermore, with reference to the advantageous embodiments in FIGS. 1 and 2, the sensor elements b; b1, b2, b4, b5, b6, b8 of the controlling device 1 monitoring the alarm route readinesses of the alarm system to outside the site K, are being coupled with two-way connections x to the data processing unit a, in order to use one or more sensor elements b as the alarm system's alarm connection.

As a further advantageous embodiment of the method, in connection with an alarm to outside the site a report of a detected error type is sent by the controlling device 1. In this way, the significance of the alarm may be evaluated outside the site, when e.g. only a temporary break in the current supply of the electrical network, or an Internet connection break, does not demand instant check up procedures in the site when a necessary amount of other alarm routes are still functioning. In this context, it is on the other hand possible to forward information also on the location of an error source using localization arrangements based on satellite or mobile phone localization, and/or the like, e.g. by utilizing triangle calculation.

The invention may also be utilized in connection with traditional security arrangements used in the site in a way that the alarm that has been received therefrom is forwarded though one or more controlling devices 1, 1' to outside the site.

The invention relates on the other hand to a control arrangement, which is meant especially for securing the forwarding of an alarm of an abnormal action or situation in a site K, detected by an alarm arrangement, such as one or more burglary or motion detectors, window sensors and/or the like, of the alarm system monitoring the site K, out of the site K from the alarm system. The control arrangement monitors the alarm system's readiness of forwarding an alarm out of the site belonging thereto, by which at least data transmission connections of the alarm system to outside the site are being repetitively checked in order to enable sending the alarm via one or more secondary alarm connections, in case the primary alarm connection is prevented. The control arrangement comprises e.g. with reference to the advantageous embodiments shown in FIGS. 3 and 4, at least two separate controlling devices 1, 1', whereby each controlling device comprising of a data processing unit a, such as one or more microprocessors, logical circuits and/or the like, and sensor elements b coupled therewith in order to monitor continuously the site's K electric connection/readiness to at least two of the following:

b1: a data transmission route working on a free frequency (ISM-bands), such as to a WLAN-, Bluetooth-, ZigBee-network and/or the like,
b2: a mobile phone network, such as to a NMT-, GSM-, GPRS-, 3G-, 4G-net and/or the like,
b3: an electricity grid,
b4: the internet,
b5: one or several other controlling devices 1, 1',
b6: a communication connection working on a free frequency (ISM-bands), such as a 902-928 MHz, 2,4000-2,4835 Ghz, 5,728-5,850 Ghz frequency route and/or the like,
b7: an alarm arrangement belonging to the alarm system,
b8: a wired connection, such as a landline phone network, a landline network between the controlling devices and/ or the like.

When a data processing unit a of one or more controlling devices 1, 1' detects a faulty connection/state of one or more sensor elements b, the controlling device 1, 1' forwards the alarm to outside the site K through an external data transmission connection that has been ascertained available for its one or more sensor elements b.

As an advantageous embodiment of the control arrangement according to the invention, it comprises of at least two controlling devices 1 that are situated essentially in different locations in the site K, and coupled with each other at least in a data transmitting manner for performing mutual connection/state checks between the same. In this context, as a further advantageous embodiment, especially with reference to the principal operational charts shown in FIGS. 3 and 4, it comprises of one or more controlling devices 1' existing outside the site K in order to perform mutual communication/state checks between the same and one of several controlling devices 1 existing in the site K.

Furthermore as an especially advantageous embodiment, especially with reference to the operational chart shown in FIG. 4, two or more, advantageously three controlling devices 1 existing in the site K are used on a loop principle s1, s2, s3, whereby the controlling devices 1 do not necessarily have in common other sensor elements making connection/state checks than the sensor elements b; b5 performing the mutual connection/state checks of the controlling devices 1. In this way, the device composition of the control arrangement maybe significantly simplified, especially with a view to a solution based on utilizing in all parts similar control devices, whereby checks of all available alarm readinesses' are made by the control devices 1 connected to the loop one after another.

Furthermore as an advantageous embodiment of the control arrangement especially with reference to FIGS. 1 and 2, the sensor elements b; b1, b2, b4, b5, b6, b8 of the controlling device 1 monitoring the alarm route readinesses of the alarm system to outside the site K are being coupled with two-way connections x to the data processing unit 1a in order to use one or more sensor elements b as the alarm system's alarm connection.

As a further advantageous embodiment of the control arrangement according to the invention, one or more controlling devices 1 in the site K are provided with a localization arrangement working based on satellite, mobile phone or network localization and/or the like manner, in order to determine location of an error source e.g. in a triangle calculation principle or the like manner.

The control arrangement, according to the invention, is e.g. according to the general principle shown in FIG. 3 arranged to work in connection with an alarm system in a site e.g. in the following manner: when the processor unit a of the controlling device 1 notices that one of its sensor elements b does not answer a connection check in a pre-set time limit or if it notices a repeated obstruction in the signal, it starts sending an alarm signal through all possible detours, ergo with all its sensor elements b. At this time, possible other alarm devices may also get information about the problem, whereby it is possible for them to repeat the alarm by sending an alarm signal with all their possible detours. When at least one alarm device manages to send an alarm to a public network, such as a mobile phone network and/or internet network, the functioning of the alarm system is managed to be secured.

The operating principle of the control arrangement according to the invention is furthermore, when using an external alarm device e.g. according to FIG. 3, as follows:

When the external controlling device 1' is located physically totally apart from the site K to be monitored by the alarm system, it is therefore independent from the electricity blackouts or blocking attempts on the wireless network in the site, so it is functional even when the other controlling devices are "out of the game". Hence, in case e.g. some sensor element of the controlling device 1 in the site does not respond in a pre-set time limit to the connection check up made by the external controlling device 1' or if it notices a repeated obstruction in some of the signals, it starts sending out an alarm with all its possible detours.

It is clear that the invention is not limited to the embodiments shown or described above, but instead, it can be modified in various ways to fit the needs of each utilization purpose and embodiment surrounding it within the limits of the basic idea. Therefore, it is clear that the controlling device, according to the invention, that is to be located in the site to be monitored can include a more simple entirety with less sensor elements than in the solution e.g. shown in FIG. 1. On the other hand, also the external controlling device utilized in the invention may include a broader entirety than what is shown in FIG. 2, including sensor elements for monitoring its preferred electric connections at each time. In addition it is clear that each of the controlling devices are naturally advantageously equipped with arrangements following and if necessary, alarming of the state of e.g. its own accumulator etc.

The invention claimed is:

1. A method to secure an alarm system, which method is meant especially for securing the forwarding of an alarm of an abnormal action or situation in a site, detected by an alarm arrangement, of the alarm system monitoring the site, out of the site from the alarm system, when the alarm system's readiness for forwarding an alarm out of the site is being monitored with a control arrangement belonging thereto, by which at least data transmission connections of the alarm system to outside the site are being repetitively checked in order to enable sending the alarm via one or more secondary alarm connections, in case the primary alarm connection is prevented, wherein the control arrangement comprises at least two separate controlling devices, when each controlling device by its data processing unit, through sensor elements coupled thereto monitors continuously the site's electric connection/readiness to at least two of the following:
a data transmission route working on a free frequency
a mobile phone network,
an electricity grid,
the internet,
one or several other controlling devices,
a communication connection working on a free frequency
an alarm arrangement belonging to the alarm system,
a wired connection,
wherein, when a data processing unit of one or more controlling devices detects a faulty connection/state of one or more sensor elements, the alarm to outside the site is being forwarded by the controlling device through an external data transmission connection that has been ascertained available for its one or more sensor elements.

2. The method according to claim 1, wherein two or more controlling devices are being utilized that are situated essentially in different locations in the site and coupled with each other at least in a data transmitting manner, between which mutual connection/state checks are being made.

3. The method according to claim 1, wherein the two or more in the site (K) are being used in a loop principle in a way that the controlling devices do not necessarily have in common other sensor elements making connection/state checks than the sensor elements performing the mutual connection/state checks of the controlling devices.

4. The method according to claim 1, wherein one or more controlling devices external to the site, and operating in a current supply ensured manner by an accumulator, are being utilized, wherein the mutual connection/state checks are being made between the external controlling device and one or more controlling devices in the site, in order to forward the alarm to outside the site based on a detected connection/state failure through one or more controlling devices.

5. The method according to claim 1, wherein the sensor elements of the controlling device monitoring the alarm route readinesses of the alarm system to outside the site are being coupled with two-way connections to the data processing unit in order to use one or more sensor elements as the alarm system's alarm connection.

6. The method according to claim 1, wherein in connection with an alarm to outside the site, a report of a detected error type, a location of an error source determined by satellite or mobile phone localization, and/or like information is being forwarded by the controlling device.

7. A control arrangement, which is meant especially for securing the forwarding of an alarm of an abnormal action or situation in a site, detected by an alarm arrangement, of the alarm system monitoring the site, out of the site from the alarm system, wherein the control arrangement monitors the alarm system's readiness of forwarding an alarm out of the site belonging thereto, by which at least data transmission connections of the alarm system to outside the site are being repetitively checked in order to enable sending the alarm via one or more secondary alarm connections in case the primary alarm connection is prevented, the control arrangement comprising:
at least two separate controlling devices, each controlling device comprising a data processing unit, and sensor elements coupled therewith in order to monitor continuously the site's electric connection/readiness to at least two of the following:
a data transmission route working on a free frequency
a mobile phone network,
an electricity grid,
the internet,
one or several other controlling devices,
a communication connection working on a free frequency,
an alarm arrangement belonging to the alarm system,
a wired connection,
wherein, when a data processing unit of one or more controlling devices detects a faulty connection/state of one or more sensor elements, the controlling device forwards the alarm to outside the site through an external data transmission connection that has been ascertained available for its one or more sensor elements.

8. The control arrangement according to claim 7, further comprising:
at least two controlling devices that are situated essentially in different locations in the site and coupled with each other at least in a data transmitting manner for performing mutual connection/state checks between the same.

9. The control arrangement according to claim 7 further comprising:
one or more controlling devices existing outside the site in order to perform mutual communication/state checks between the same and one of several controlling devices existing in the site.

10. The control arrangement according to claim 7, wherein two or more controlling devices existing in the site are used in a loop principle in a way that the controlling devices do not necessarily have in common other sensor elements making connection/state checks than the sensor elements performing the mutual connection/state checks of the controlling devices.

11. The control arrangement according to claim 7, wherein the sensor elements of the controlling device monitoring the alarm route readinesses of the alarm system to outside the site are being coupled with two-way connections to the data processing unit in order to use one or more sensor elements as the alarm system's alarm connection.

12. The control arrangement according to claim 7, wherein one or more controlling devices in the site are provided with a localization arrangement working based on satellite, mobile phone or network localization and/or the like manner, in order to determine location of an error source.

* * * * *